US008702002B2

(12) United States Patent  (10) Patent No.: US 8,702,002 B2
Gregerson  (45) Date of Patent: Apr. 22, 2014

(54) METHOD, APPARATUS AND SYSTEM FOR SCANNING OPTICAL CODES

(75) Inventor: David L. Gregerson, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 31 days.

(21) Appl. No.: 13/562,587

(22) Filed: Jul. 31, 2012

(65) Prior Publication Data

US 2014/0034735 A1  Feb. 6, 2014

(51) Int. Cl.
*G06K 7/10* (2006.01)

(52) U.S. Cl.
USPC ............ 235/462.14; 235/462.36; 235/462.06

(58) Field of Classification Search
USPC ............ 235/462.36, 462.11, 462.38, 462.39, 235/426.4, 462.43, 462.14, 462.06
See application file for complete search history.

(56) References Cited

U.S. PATENT DOCUMENTS

| 6,854,655 | B2 * | 2/2005 | Barkan .................... 235/462.4 |
| 6,899,272 | B2 * | 5/2005 | Krichever et al. ....... 235/462.37 |
| 2001/0038037 | A1 * | 11/2001 | Bridgelall et al. ....... 235/462.14 |
| 2012/0007738 | A1 * | 1/2012 | Barkan et al. ................. 340/540 |
| 2012/0145791 | A1 * | 6/2012 | Gregerson .................... 235/470 |
| 2012/0325913 | A1 * | 12/2012 | Collins et al. ........... 235/462.07 |

* cited by examiner

*Primary Examiner* — Sonji Johnson

(74) *Attorney, Agent, or Firm* — Harden E. Stevens, III; Paul W. Martin

(57) ABSTRACT

A method, apparatus and system are presented for improving an optical code scanner used in an assisted service point of sale terminal by automatically detecting the placement of an item for scanning on the customer side of the optical code scanner and configuring the scanner to scan the item. Once the item is scanned, the optical code scanner reconfigures to scan items presented on the cashier side of the scanner. When the scanner automatically detects, configures and scans an item presented on the customer side of the scanner, it reduces the checkout time and reduces the number of operations a cashier must perform.

20 Claims, 5 Drawing Sheets

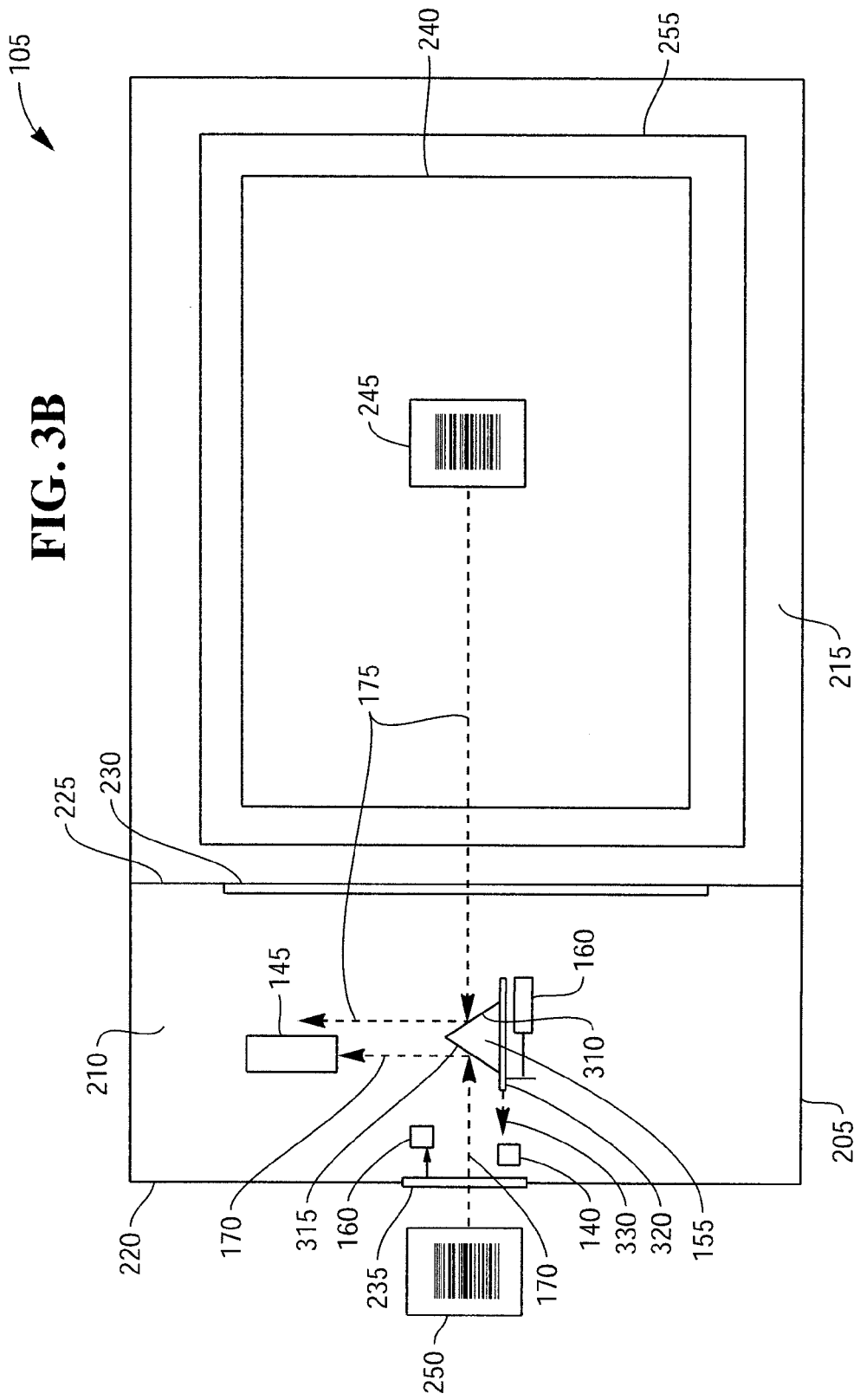

METHOD, APPARATUS AND SYSTEM FOR SCANNING OPTICAL CODES

FIELD OF THE INVENTION

The present invention relates generally to a hybrid optical code scanner or imaging optical code scanner. More particularly, but not exclusively, it relates to improvements to an optical code scanner to automatically scan optical codes presented to different sides of the scanner.

BACKGROUND

Any discussion of prior art throughout the specification should in no way be considered as an admission that such prior art is widely known or forms part of common general knowledge in the field.

An assisted service point of sale (POS) terminal is a POS terminal operated by a cashier. The POS terminal includes an optical code scanner for scanning and identifying optical codes attached to or printed on an item or document. In a typical purchase transaction, a customer brings one or more items for purchase to the POS terminal and the cashier presents each item to the POS terminal, which scans and identifies the item. During the transaction, the customer may be asked to present identification (ID) as proof of age or the customer may have a coupon associated with an item that lowers the cost of the item. A typical ID or coupon includes an optical code that can be read by the optical code scanner.

Some optical code scanners have a scan window on the customer side of the scanner where the customer can position the ID or coupon for scanning. However, the customer must communicate to the cashier that they have an ID or a coupon for scanning. The cashier then causes the scanner to physically configure itself to scan from the customer scan window and after the ID or coupon is scanned the cashier causes the scanner to physically reconfigure itself to scan from the cashier side of the scanner.

SUMMARY OF THE INVENTION

Thus, among its several aspects, the present invention recognizes there is an advantage to having an optical code scanner that automatically: 1) detects when an optical code is presented to the customer scan window for scanning, 2) configures the scanner to scan from the customer scan window, 3) scans the customer's optical code, and 4) reconfigures the scanner to scan from the cashier side of the scanner.

Among its several aspects, the present invention seeks to overcome or ameliorate at least one of the disadvantages of the prior art, or to provide a useful alternative.

Among its several aspects, one embodiment of the present invention recognizes a condition where an optical code scanner is configured to scan optical codes presented to the cashier side of the scanner but there is a need to scan an optical code presented to the customer side of the optical code scanner. One aspect of the present invention automatically identifies the need to scan an optical code presented to the customer side of the optical code scanner by detecting when an item with the optical code is placed against a customer facing scan window. When the item is placed against the customer scan window, it blocks all of or a portion of ambient light that normally passes through the customer scan window. The scanner monitors the level of ambient light passing through the customer scan window and identifies the presence of an item for scanning when the level of ambient light falls below a predetermined level that represents a lower limit of normal ambient light.

Another aspect of the present invention is a slidable mirror assembly that is moved between a first and a second position. When the mirror assembly is located in the first position, the scanner scans optical codes on the cashier side of the scanner and when the mirror assembly is located in the second position, the scanner scans optical codes on the customer side of the scanner.

In accordance with an embodiment of the present invention, there is provided an optical code scanner for use in an assisted service point of sale terminal to read optical codes on items presented for purchase or on items that relate to the purchase. To this end, a scanner may suitably comprise: a housing that includes a vertical housing component where the vertical housing component includes a cashier facing side and a customer facing side; a first optically transparent window located on the cashier facing side of the vertical housing component; a second optically transparent window located on the customer facing side of the vertical housing component; an image capture device for capturing images of optical codes directed to it.

The scanner may further suitably comprise: an image directing device movable between a first position and a second position where images passing through the first optically transparent window are directed to the image capture device when the image directing device is in the first position and where images passing through the second optically transparent window are directed to the image capture device when the image directing device is in the second position; a light level detector that generates a signal representing the level of ambient light passing through the second optically transparent window; an actuator attached to the image directing device where the actuator moves the image directing device between the first position and the second position; and a processor operable to execute instructions that when executed causes the processor to determine when the signal from the light level detector falls below a predetermined threshold value and to cause the actuator to move the image directing device to the second position.

A more complete understanding of the present invention, as well as further features and advantages of the invention, will be apparent from the following Detailed Description and the accompanying Drawings.

BRIEF DESCRIPTION OF THE DRAWINGS

The aspects of the claimed invention can be better understood with reference to the Drawings and the Detailed Description. The Drawings are not necessarily drawn to scale. Throughout the Drawings, like element numbers are used to describe the same parts throughout the various drawings, figures and charts.

FIG. 3B is a high-level diagram illustrating a top down view of the optical code scanner of the present invention where the mirror assembly is located in a second position.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

As used herein, the term optical code includes a plurality of machine-readable indicium that includes, but is not limited to, one-dimensional (1D) barcodes and two-dimensional (2D) barcodes.

Figure 1:
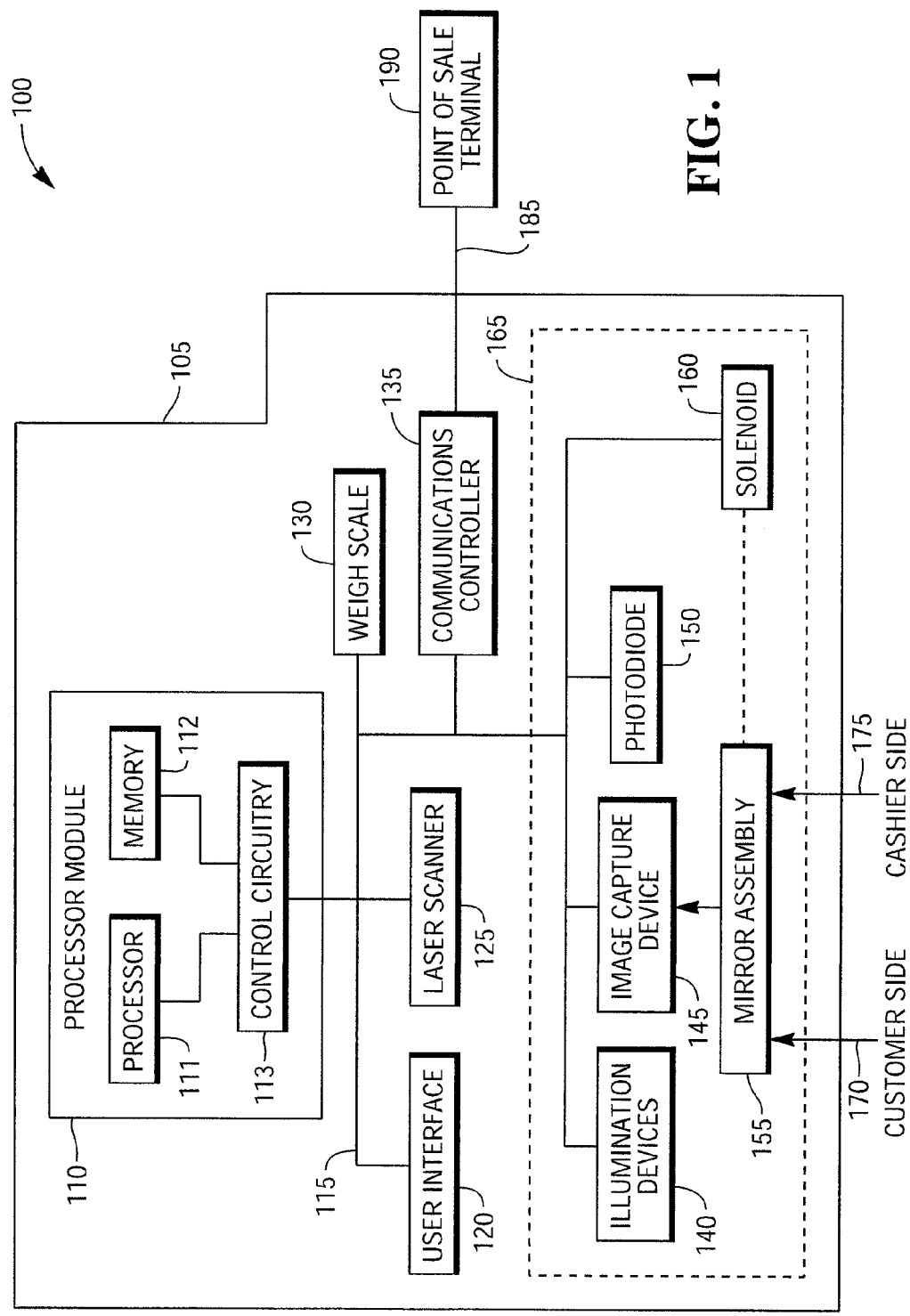
FIG. 1 is a high-level drawing illustrating an exemplary embodiment of an assisted service point of sale system.

Referring now to FIG. 1, there is provided a high-level drawing illustrating an exemplary embodiment of an assisted service point of sale system 100. The system 100 includes an optical code scanner (scanner) 105 and an assisted service point of sale terminal 190. The optical code scanner 105 of the present invention is a hybrid bi-optic type scanner meaning it uses both a laser based scanner 125 and an image based scanner 165 to read an optical code presented to the scanner 105. In other embodiments, the optical code scanner 105 uses just an image based scanner to read optical codes.

The scanner 105 includes a processor module 110, a user interface 120, the laser scanner 125, a weigh scale 130, a communications controller 135, the image scanner 165 and a user interface 165. The processor module 110 includes a processor 111, a memory 112 and control circuitry 113. The memory 112 includes both volatile and non-volatile memory. The processor 111 executes software instructions stored in the memory 112 which causes the processor 111 to control the elements of the scanner 105 to implement the features and functions of the scanner 105. The control circuitry 113 includes hardware interfaces between the processor 111 and the memory 112 and between the processor 111 and a bus 115 used to communicate with other elements of the scanner 105.

The laser scanner 125 includes a mirrored polygon spinner, a laser diode that generates a laser beam directed at the rotating spinner and a plurality of mirrors that direct laser beams reflected off the spinner to a main scan area above the scanner 105. The main scan area is located on the cashier side of the scanner 105. The laser scanner 125 further includes a laser detector that detected laser light reflected off of optical codes presented to the scanner 105. The laser detector converts the received laser light to electrical signals that are processed by the processor 111 to read the scanned optical code.

The communications controller 135 includes hardware and software that are required to communicate over an external network 185 with a POS terminal 190. In some embodiments, the communications controller 135 includes a wireless communications device that communicates wirelessly with the POS terminal 190. In other embodiments, the communications controller 135 supports a Universal Serial Bus (USB) controller that communicates with the point of sale terminal and other peripherals over the external network 185.

The image scanner 165 includes a plurality of illumination devices 140, an image capture device 145, a photodiode 150, a mirror assembly 155 and a solenoid 160. The plurality of illumination devices 140 are divided into two groups. A first group of devices directs light toward the cashier side (FIG. 2, element 225) of the scanner 105 and a second group of devices directs light toward the customer side (FIG. 2, element 220) of the scanner 105. The plurality of illumination devices 140 are controlled by the processor 111 which turns the devices on and off and can adjust the level of illumination when they are on. The processor 111 can individually control the first and second groups of devices.

The image capture device 145 receives an image from the mirror assembly 155 and captures the image. The image is then processed by the processor 111 to decode an optical code captured in the image. The mirror assembly 155 includes a first and a second mirror (FIG. 3A, elements 310,315) that are mounted on a supporting member (FIG. 3A, element 320). The mirror assembly 155 is configured to move between a first position and a second position. When the mirror assembly 155 is in the first position (depicted in FIG. 3A), images 175 from the cashier side (FIG. 2, element 225) of the scanner 105 are directed to the image capture device 145. When the mirror assembly 155 is in the second position (depicted in the FIG. 3B), images from the customer side (FIG. 2, element 220) are directed to the image capture device 145. The solenoid 160, which is controlled by the processor 111, is attached to the mirror assembly 155 and moves the mirror assembly 155 to the first or to the second position. The photodiode 150 or a light level detector determines the amount of ambient light received from the customer side (FIG. 2, element 220) through a customer facing scan window (FIG. 2, element 235).

The user interface 120 includes a speaker that communicates with the cashier or the customer by producing audible sounds associated with different functions. The user interface 120 further includes lights that are used to indicate that status of certain functions such as when a scan is successful and which of the two positions the mirror assembly 155 is in (cashier or customer). The user interface 120 also receives input from the cashier through input devices which include a first control button (FIG. 3, element 330). The first control button 330 is used to configure the mirror assembly 155. When the first control button 330 is pressed, a signal is generated and received by the processor 111 which responds by causing the solenoid 160 to move the mirror assembly 155 to the second position. Once the scan from the customer side is complete, the processor 111 causes the solenoid 160 to move to the first position which directs images from the cashier side to the image capture device 145.

Figure 2:
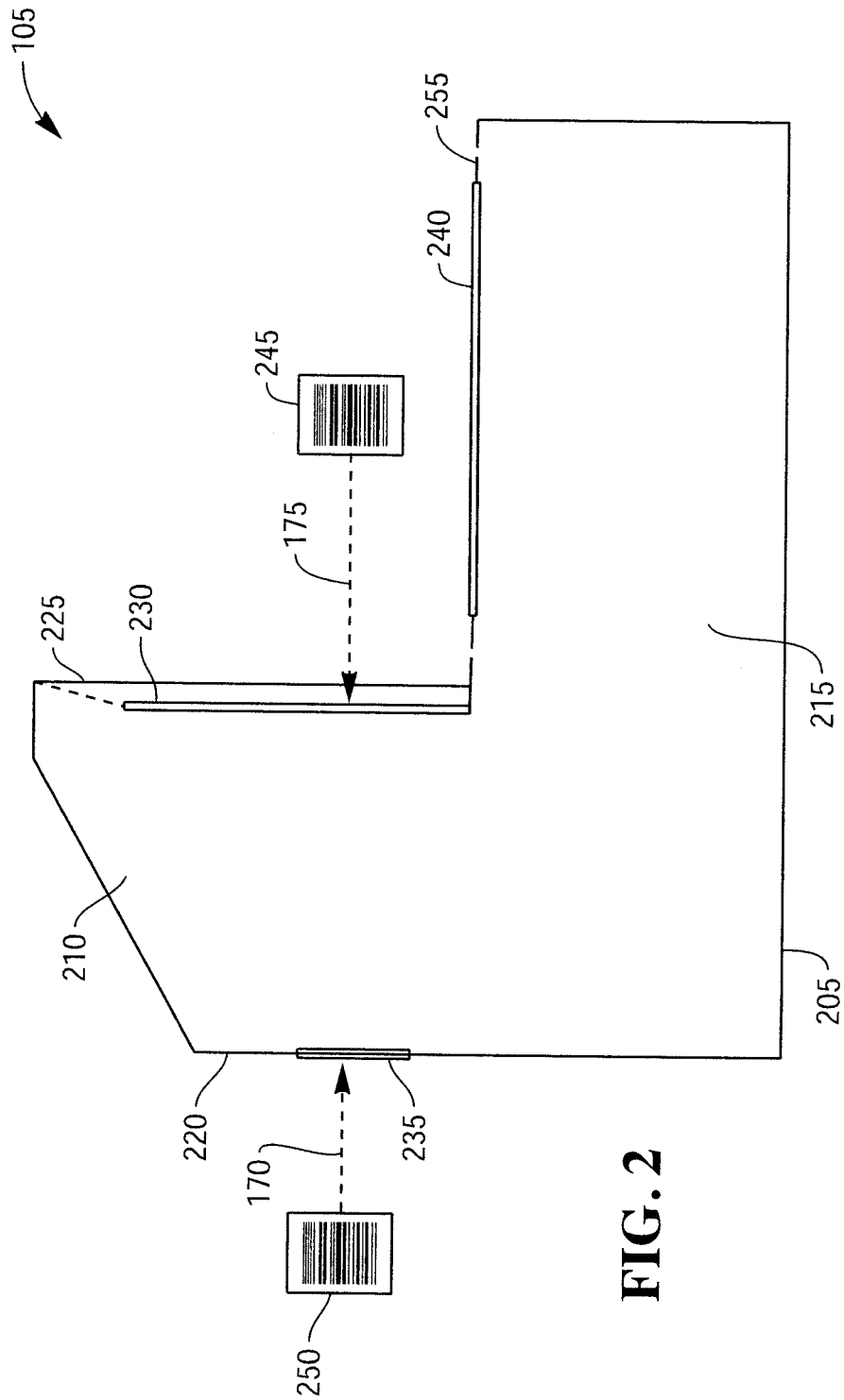
FIG. 2 is a high-level drawing illustrating a side view of an optical code scanner of the present invention.
Figure 3A:
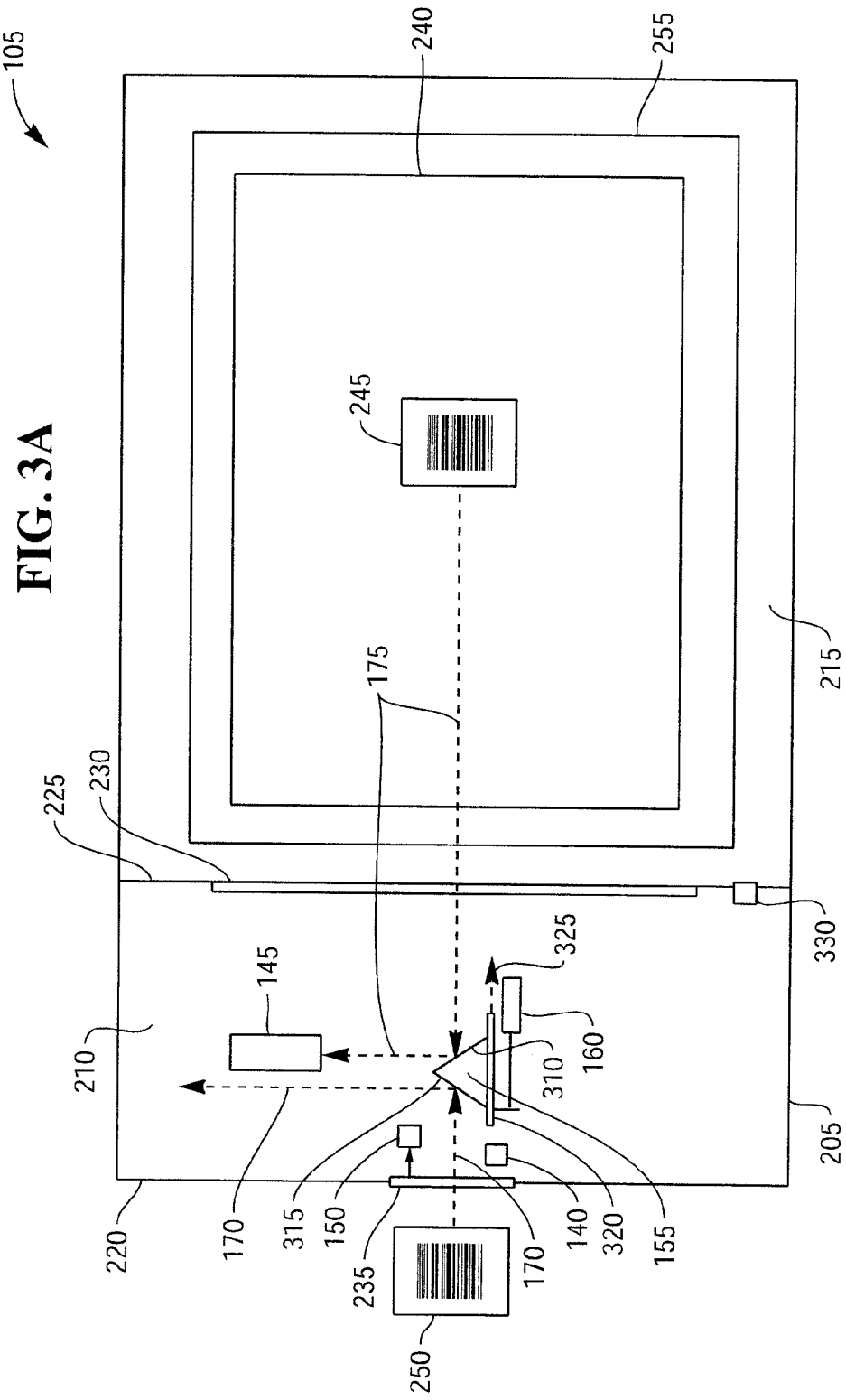
FIG. 3A is a high-level diagram illustrating a top down view of the optical code scanner of the present invention where the mirror assembly is located in a first position.

Turning to FIG. 2, there is provided a high-level drawing illustrating a side view of the scanner 105. The scanner 105 includes a housing 205 which includes a base housing component 215 and a vertical housing component 210. The base housing component 215 includes a weigh plate 255 that is a component of the weigh scale 130. A horizontal window 240 is located within the weigh plate 255. The horizontal window 240 is filled with a material that is substantially optically transparent to the laser beams generated by the laser scanner 125, some of which are directed through the horizontal window 240. The vertical housing component 210 includes the cashier facing surface 225 which includes a cashier facing vertical window 230 through which images and laser beams pass. The vertical housing component 210 includes a customer facing side 220 which includes a customer facing scan window 235 through which images from the customer side pass. FIG. 2 further depicts a first optical code 245 located over the scanner 105 on the cashier side and an image path 175 that is directed from the item 245 to the vertical window 230. A second optical code 250 is located on the customer side of the scanner with an image path 170 from the second optical code 250 to the customer facing scan window 235. Both the customer facing scan window 235 and the cashier facing vertical window 230 are filled with a material that is substantially optically transparent to the laser beams generated by the laser scanner 125.

Referencing FIG. 3A, there is provided a high-level diagram illustrating a top down view of the scanner 105 of the present invention where the mirror assembly 155 is located in a first position. In the first position, an image of the first optical code 245 travels along image path 175 and reflects off the first mirror 310 of the mirror assembly 155 to the image capture device 145. When the mirror assembly 155 is in the first position, as depicted, the solenoid 160 moves it in a forward direction 325 to the second position.

Referencing FIG. 3B, there is provided a second, top down view illustrating the scanner 105 of the present invention with the mirror assembly 155 in a second position. In the second position, an image of the second optical code 250 travels along image path 170 and reflects off the second mirror 315 of the mirror assembly 155 to the image capture device 145. When the mirror assembly 155 is in the second position, as depicted, the solenoid 160 moves it in a rearward direction 330 to the first position.

Figure 4:
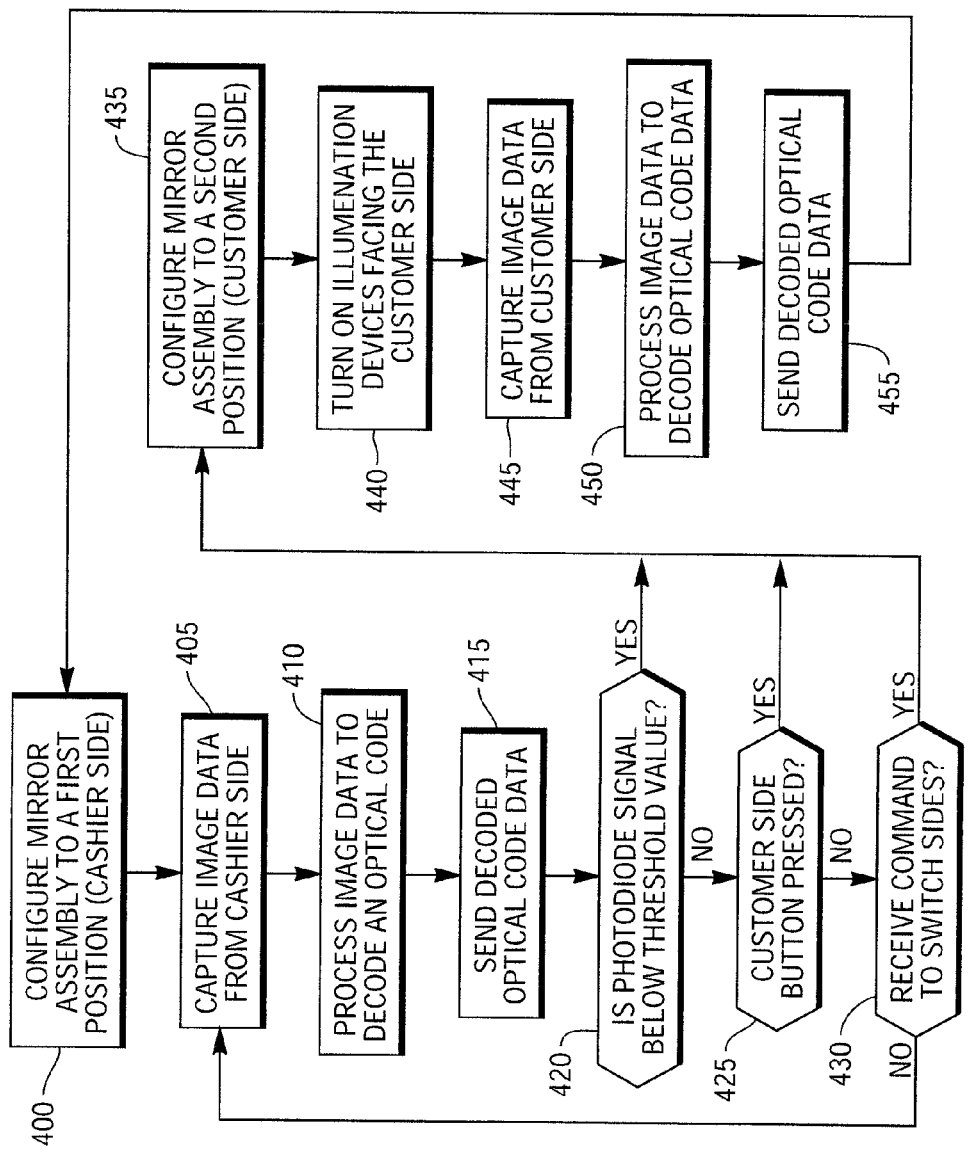
FIG. 4 is a high-level flow chart illustrating an exemplary method for operating the optical code scanner of the present invention.

FIG. 4 is a high-level flow chart illustrating an exemplary method of operating the scanner 105. The actions and functions described in this method are performed by the processor 111. In this method, the scanner 105 automatically detects when a customer places an item that needs to be scanned against the customer facing scan window 235 and moves the mirror assembly 155 to the second position so the image capture device 145 can capture an image from the customer side of the scanner 105. The scanner 105 will perform this function automatically without direction from the cashier or the customer (other than the customer placing the item next to the customer facing scan window 235).

In some embodiments, the scanner 105 measures and maintains metrics on the functions performed by the cashier. The metrics include the average time between scans. The scans can either be performed by the laser scanner 125 or the image scanner 165. When the scanner 105 detects that the customer has placed an item for scanning against the customer facing scan window 235, it uses the average time between scans to determine if a customer side scan can be performed during the average time between scans. The time to perform a customer side scan includes moving the mirror assembly 155 to the second position, capturing an image and then moving the mirror assembly 155 back to the first position. If the customer side scan can be performed between cashier scans, the scanner 105 performs the customer side scan after the next cashier side scan is complete. When the scanner 105 is performing a customer side scan, the laser scanner 125 is still scanning optical codes on the cashier side.

At step 400, the solenoid 160 moves the mirror assembly 155 to the first position. From the first position, images from the cashier side of the scanner 105 are directed to the image capture device 145. This is the normal operating position for the mirror assembly 155. Additionally, the illumination devices 140 that are aimed toward the cashier side of the scanner 105 are turned on and the illumination devices 140 that are aimed toward the customer side of the scanner 105 may be turned off. At step 405, the image capture device 145 captures an image from the cashier side of the scanner 105. The processor 111 causes the image capture device 145 to capture the image. At step 410, the processor 111 receives and processes the image data to decode an optical code captured in the image data. At step 415, the processor 111 sends data about the decoded optical code to the POS terminal 190.

At step 420, the processor 111 reads the output signal from the photodiode 150 and determines if the value is below a predetermined threshold value. The photodiode 150 measures the level of ambient light passing through the customer facing scan window 235 and the output signal represents the real-time ambient light level. Ambient light levels vary within a known range. The predetermined threshold value is a value that represents an ambient light level below the lowest level of the known range. When a customer places an item against the customer facing scan window 235, it blocks all or a portion of the ambient light that normally passes through the customer facing scan window 235. This causes the output signal of the photodiode 150 to fall below the predetermined threshold value. When the output signal is below the predetermined threshold value, control is transferred to step 435, otherwise control passes to step 425.

At step 425, the processor 111 determines if the first control button 330 has been pressed by the cashier. If it has, control is passed to step 435, otherwise control passes to step 430. The first control button 330 is used by the cashier to manually force the scanner 105 to move the mirror assembly 155 to the second position and to scan the customer facing scan window 235. Cashier intervention could be necessary when an optical code is displayed on an electronic device and the ambient light levels fail to fall below the predetermined threshold value because of light emitted by the device (the light is typically generated by the backlight in the device).

At step 430, the processor 111 determines if a command to switch the mirror assembly 155 to the second position has been received by the scanner 105 from the POS terminal 190. If it has, control is passed to step 435, otherwise control passes back to step 405 to continue scanning the cashier side of the scanner 105. When the POS terminal determines that an age restricted item has been scanned, the customer is required to produce an identification document (ID) as proof of age. The POS terminal 190 sends a command to the scanner 105 to move the mirror assembly 155 to the second position so the scanner 105 can scan the identification document. Once the document is successfully scanned, the POS terminal 190 sends a command to the scanner 105 to return the mirror assembly 155 to the first position.

At step 435, the processor 111 causes the solenoid 160 to move the mirror assembly 155 to the second position which directs images from the customer side of the scanner 105 to the image capture device 145. At step 440, the processor 111 turns on the illumination devices 140 that are aimed at the customer facing scan window 235 to illuminate an optical code presented to the customer facing scan window 235. At step 445, the image capture device 145 captures an image from the customer side of the scanner 105. The processor 111 causes the image capture device 145 to capture the image. At step 450, the processor 111 receives and processes the image data to decode an optical code captured in the image data. At step 455, the processor 111 sends data about the decoded optical code to the POS terminal 190. After the optical code is scanned, control passes back to step 400.

Although particular reference has been made to an embodiment of the invention that includes an optical code scanner in communication with an assisted service point of sale terminal and examples have been provided illustrating the invention, certain other embodiments, variations and modifications are also envisioned within the spirit and scope of the following claims.

I claim:

1. An optical code scanner for automatically detecting and reading optical codes presented to the optical code scanner from different sides, the optical code scanner comprising:
   a housing that includes a vertical housing component where the vertical housing component includes a cashier facing side and a customer facing side;
   a first optically transparent window located on the cashier facing side of the vertical housing component;
   a second optically transparent window located on the customer facing side of the vertical housing component;
   an image capture device for capturing images of optical codes;
   an image directing device movable between a first position and a second position where images passing through the first optically transparent window are directed to the image capture device when the image directing device is in the first position and where images passing through the second optically transparent window are directed to the image capture device when the image directing device is in the second position;

a light level detector where the detector generates a signal representing the level of ambient light passing through the second optically transparent window;

an actuator attached to the image directing device where the actuator moves the image directing device between the first position and the second position; and a processor where the processor executes instructions that cause the processor to determine when the signal from the light level detector falls below a predetermined threshold value and to cause the actuator to move the image directing device to the second position.

2. The optical code scanner of claim 1, wherein the image directing device includes a first mirror and a second mirror mounted on a slidable support member where the first mirror directs images passing through the first optically transparent window when the image directing device is in the first position and where the second mirror directs images passing through the second optically transparent window when the image directing device is in the second position.

3. The optical code scanner of claim 1, wherein the housing further includes a base housing component that includes a horizontal top surface that includes a horizontal third optically transparent window.

4. The optical code scanner of claim 3, further including a laser scanner where the laser scanner generates and directs laser beams through the first optically transparent window and the third optically transparent window to read optical codes.

5. The optical code scanner of claim 4, further including a weigh scale configured to determine the weight of items placed on the third optically transparent window.

6. The optical code scanner of claim 1, wherein the instructions further cause the processor to process an image captured by the image capture device and to read an optical code captured in the image.

7. The optical code scanner of claim 1, wherein the instructions when executed by the processor further cause the image capture device to capture an image that passes through the second optically transparent window when the image directing device has moved to the second position.

8. The optical code scanner of claim 1, further including:
a first input device located on the housing facing the cashier where the first input device generates a first input control signal when the device is activated; and
wherein the instructions when executed by the processor further cause the image directing device to move to the second position when the first input control signal is generated.

9. The optical code scanner of claim 1, wherein the instructions when executed by the processor further receives a move image directing device command from an external source and as a result of receiving the command the processor causes the image directing device to move to the second position.

10. A method implemented by a computer processor in an optical code scanner where the scanner includes a housing with a cashier facing window and a customer facing window, the method comprising the steps of:
positioning a mirror assembly to a first position that directs images from the cashier facing window of the scanner to an image capture device;

determining that a level of ambient light entering the scanner from the customer facing window has dropped below a predefined threshold value;

positioning the mirror assembly to a second position that directs images from the customer facing window of the scanner to the image capture device as a result of determining the level of ambient light from the customer facing window dropped below the predefined threshold value;

capturing a first image from the customer facing window using the image capture device when the mirror assembly is in the second position; and positioning the mirror assembly to the first position after capturing the first image from the customer facing window.

11. The method of claim 10, further comprising:
decoding information about a first optical code from the first image;
sending the information about the first optical code to an external device;
capturing a second image from the cashier facing window using the image capture device when the mirror assembly is in the first position;
decoding a second optical code from the second image; and
sending the second optical code information to the external device.

12. The method of claim 11, wherein the external device is an assisted point of sale terminal.

13. The method of claim 10, further comprising:
generating a plurality of scanning laser beams from a laser beam directed at a rotating mirrored polygon spinner;
directing the plurality of scanning laser beams through the cashier facing window; and
detecting laser light reflected from an optical code positioned above the optical code scanner by a laser detector.

14. The method of claim 10, further comprising:
receiving a configuration command from the external device where the configuration command instructs the scanner to move the mirror assembly to the second position; and
positioning the mirror assembly to the second position that directs images from the customer facing window of the scanner to the image capture device as a result of receiving the configuration command.

15. The method of claim 10, further comprising:
receiving a control signal from an input control device mounted on a surface of the housing facing the cashier; and
positioning the mirror assembly to the second position that directs images from the customer facing window of the scanner to the image capture device as a result of receiving the control signal.

16. A system for processing a purchase transaction, the system comprising:
an assisted point of sale terminal; and
an optical code scanner in communication with the assisted point of sale terminal, the scanner comprising:
a housing that includes a vertical housing component where the vertical housing component includes a cashier facing side and a customer facing side;
a first optically transparent window located on the cashier facing side of the vertical housing component;
a second optically transparent window located on the customer facing side of the vertical housing component;
an image capture device for capturing images of optical codes;

an image directing device movable between a first position and a second position where images passing through the first optically transparent window are directed to the image capture device when the image directing device is in the first position and where images passing through the second optically transparent window are directed to the image capture device when the image directing device is in the second position;

a light level detector that generates a signal representing a level of ambient light passing through the second optically transparent window;

an actuator attached to the image directing device where the actuator moves the image directing device between the first position and the second position; and a processor operable to execute instructions that when executed causes the processor to determine when the signal from the light level detector falls below a predetermined threshold value and to cause the actuator to move the image directing device to the second position.

17. The scanner of claim 16, wherein the image directing device includes a first mirror and a second mirror mounted on a slidable support member where the first mirror directs images passing through the first optically transparent window when the image directing device is in the first position and where the second mirror directs images passing through the second optically transparent window when the image directing device is in the second position.

18. The scanner of claim 16, wherein the housing further includes a base housing component that includes a horizontal top surface that includes a horizontal third optically transparent window.

19. The scanner of claim 18, further including a laser scanner that directs laser beams through the first optically transparent window and the third optically transparent window to read optical codes.

20. The scanner of claim 19, further including a weigh scale configured to determine the weight of items placed on the third optically transparent window.

* * * * *